United States Patent
Macken et al.

(10) Patent No.: US 9,990,947 B1
(45) Date of Patent: Jun. 5, 2018

(54) PAD SHARING FOR CONTACT SENSOR AND BOLOMETER WITH TEMPERATURE COMPENSATION IN HEAT-ASSISTED MAGNETIC RECORDING DEVICE

(71) Applicant: Seagate Technology LLC, Cupertino, CA (US)

(72) Inventors: Declan Macken, Eden Prairie, MN (US); Jon Karsten Klarqvist, Roseville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/789,415

(22) Filed: Oct. 20, 2017

Related U.S. Application Data

(63) Continuation of application No. 15/370,975, filed on Dec. 6, 2016, now Pat. No. 9,824,705.

(60) Provisional application No. 62/277,586, filed on Jan. 12, 2016.

(51) Int. Cl.
*G11B 5/02* (2006.01)
*G11B 5/48* (2006.01)
*G11B 7/1263* (2012.01)
*G11B 5/00* (2006.01)

(52) U.S. Cl.
CPC ......... *G11B 5/4853* (2013.01); *G11B 5/4866* (2013.01); *G11B 7/1263* (2013.01); *G11B 2005/0021* (2013.01)

(58) Field of Classification Search
CPC ......... G11B 2005/0021; G11B 5/4866; G11B 5/4853; G11B 11/10595; G11B 11/1053; G11B 5/6005; G11B 11/10558; G11B 5/54

USPC ............... 360/59, 75, 328; 369/13.14, 13.33, 369/13.34, 13.13
See application file for complete search history.

(56) References Cited

U.S. PATENT DOCUMENTS

| | | |
|---|---|---|
| 7,928,386 B2 | 4/2011 | Frey et al. |
| 8,705,323 B2 | 4/2014 | Contreras et al. |
| 8,810,947 B1 | 8/2014 | Ren et al. |
| 8,824,085 B2 | 9/2014 | Wilson et al. |
| 8,842,507 B1 | 9/2014 | Hirano et al. |
| 8,879,189 B2 | 11/2014 | Miyamoto et al. |
| 8,908,483 B1 | 12/2014 | Ren et al. |
| 9,030,773 B2 | 5/2015 | Macken et al. |

(Continued)

OTHER PUBLICATIONS

U.S. Appl. No. 15/370,975, filed Dec. 6, 2016, Macken et al.

*Primary Examiner* — Nabil Hindi
(74) *Attorney, Agent, or Firm* — Hollingsworth Davis, LLC

(57) ABSTRACT

A slider of a heat-assisted recording head comprises electrical bond pads coupled to bias sources and a ground pad, an air bearing surface, and a waveguide configured to receive light from a laser source. A contact sensor proximate the air bearing surface is coupled between a first bond pad and a second bond pad. A bolometer is coupled to a reference thermal sensor. The bolometer is situated at a slider location that receives at least some of the light communicated along the waveguide. The reference thermal sensor is situated at a slider location unexposed to the light communicated along the waveguide. The bolometer and reference thermal sensor are coupled between the first and second bond pads and in parallel with the contact sensor. A ground connection is coupled to the ground pad and at a connection between the bolometer and the reference thermal sensor.

20 Claims, 7 Drawing Sheets

(56) References Cited

U.S. PATENT DOCUMENTS

| | | |
|---|---|---|
| 9,042,210 B2 | 5/2015 | Macken et al. |
| 9,153,272 B1 | 10/2015 | Rausch et al. |
| 9,177,577 B2 | 11/2015 | Macken et al. |
| 9,202,499 B2 | 12/2015 | Kiely et al. |
| 9,236,081 B1 | 1/2016 | Chu et al. |
| 9,391,424 B2 | 7/2016 | Mirov et al. |
| 9,536,555 B1 | 1/2017 | Duda et al. |
| 9,558,774 B1 | 1/2017 | Macken |
| 9,576,595 B1 | 2/2017 | Hipwell, Jr. et al. |
| 9,595,288 B1 | 3/2017 | Chu et al. |
| 9,620,163 B1 | 4/2017 | Zheng et al. |
| 9,653,121 B1 | 5/2017 | Chu et al. |
| 9,747,937 B1 | 8/2017 | Duda et al. |
| 9,799,361 B1 | 10/2017 | Duda et al. |
| 2011/0299367 A1 | 12/2011 | Naniwa et al. |
| 2012/0051196 A1 | 3/2012 | Grobis et al. |
| 2013/0188273 A1 | 7/2013 | Miyamoto et al. |
| 2013/0286802 A1 | 10/2013 | Kiely |
| 2014/0119164 A1 | 5/2014 | Wilson et al. |
| 2014/0269238 A1 | 9/2014 | Kautzky et al. |
| 2015/0109892 A1 | 4/2015 | Contreras et al. |
| 2015/0279430 A1 | 10/2015 | Trantham et al. |
| 2015/0332725 A1 | 11/2015 | Rausch et al. |
| 2016/0104514 A1 | 4/2016 | Burnett et al. |
| 2016/0284372 A1 | 9/2016 | Duda et al. |
| 2017/0032810 A1 | 2/2017 | MacKen et al. |
| 2017/0162222 A1 | 6/2017 | Matousek et al. |
| 2017/0263282 A1 | 9/2017 | Duda et al. |

PAD SHARING FOR CONTACT SENSOR AND BOLOMETER WITH TEMPERATURE COMPENSATION IN HEAT-ASSISTED MAGNETIC RECORDING DEVICE

RELATED PATENT DOCUMENTS

This application is a continuation of U.S. application Ser. No. 15/370,975, filed Dec. 6, 2016, which claims the benefit of Provisional Patent Application Ser. No. 62/277,586 filed on Jan. 12, 2016, to which priority is claimed pursuant to 35 U.S.C. § 119(e), and which are incorporated herein by reference in their entireties.

SUMMARY

Embodiments are directed to an apparatus which includes a slider of a heat-assisted magnetic recording head comprising a plurality of electrical bond pads coupled to bias sources and a ground pad. The slider comprises an air bearing surface and a waveguide configured to receive light from a laser source. A contact sensor at or near the air bearing surface is coupled between a first bond pad and a second bond pad. A bolometer is coupled to a reference thermal sensor. The bolometer is situated at a location within the slider that receives at least some of the light communicated along the waveguide. The reference thermal sensor is situated at a location within the slider unexposed to the light communicated along the waveguide. The bolometer and reference thermal sensor are coupled between the first and second bond pads and in parallel with the contact sensor. A ground connection is coupled to the ground pad and at a connection between the bolometer and the reference thermal sensor.

Other embodiments are directed to an apparatus which includes a slider of a heat-assisted magnetic recording head comprising a plurality of electrical bond pads coupled to bias sources and a ground pad. The slider comprises an air bearing surface and a waveguide configured to receive light from a laser source. A first contact sensor is situated at a first location at or near the air bearing surface. A second contact sensor is situated at a second location at or near the air bearing surface. The first contact sensor is coupled to the second contact sensor. A bolometer is connected to a reference thermal sensor. The bolometer is situated at a location within the slider that receives at least some of the light communicated along the waveguide. The reference thermal sensor is situated at a location within the slider unexposed to the light communicated along the waveguide. The bolometer and reference thermal sensor are coupled between the first and second bond pads and in parallel with the first and second contact sensors. A ground connection is coupled to the ground pad and at a connection between the bolometer and the reference thermal sensor.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
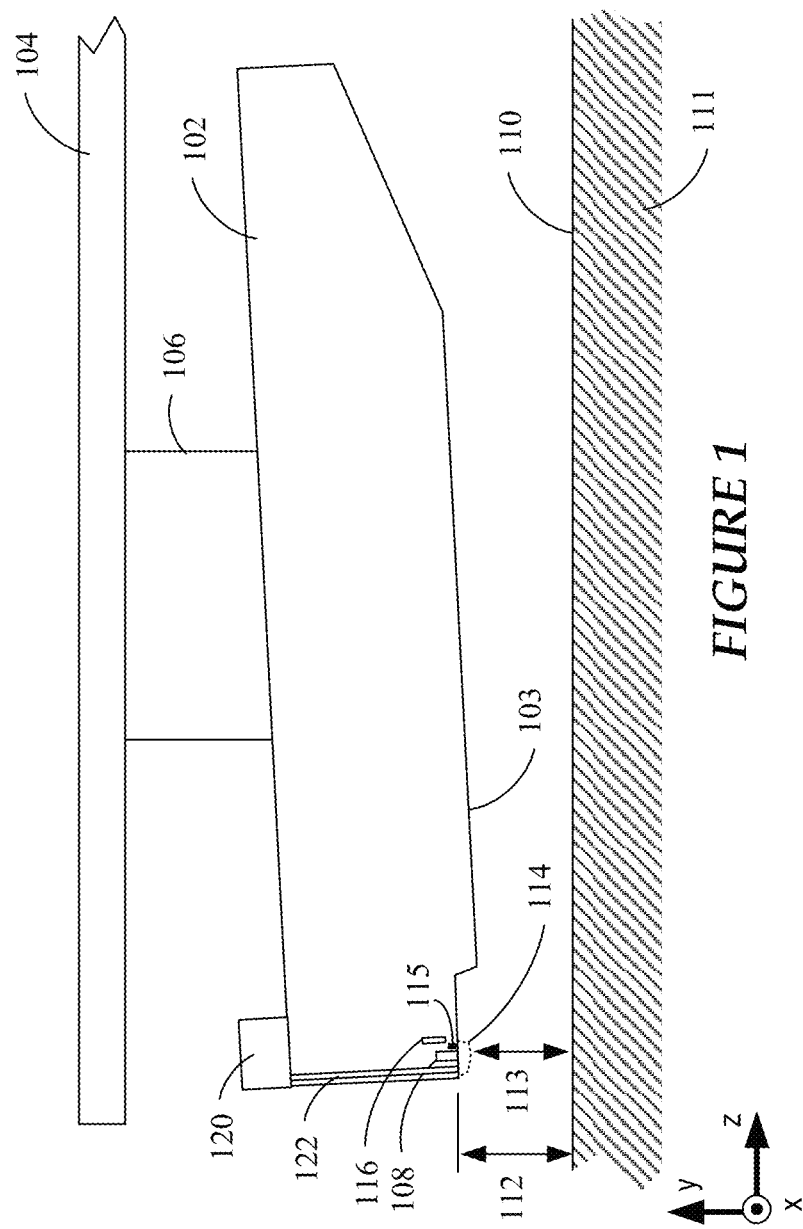
FIG. 1 is a cross-sectional view of a slider in which the various embodiments disclosed herein may be implemented.

The present disclosure generally relates to laser power monitoring and contact detection in data storage devices that employ heat-assisted magnetic recording, also referred to as energy-assisted magnetic recording (EAMR), thermally-assisted magnetic recording (TAMR), and thermally-assisted recording (TAR). This technology uses a laser source and a near-field transducer to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

A HAMR drive generally uses a laser diode to heat the recording medium to aid in the recording process. The laser diode generates heat and is also heated by other components (writer, reader, heater elements) in the magnetic slider. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses optical power output of the laser diode, and can be used to determine if the laser performance is sufficiently stable to ensure adequate writing performance. However, future integrated HAMR recording transducers will not be able to include an external photodiode due to reduced submount dimensions. For HAMR hard drives, it is critical to detect small fluctuations in laser output optical power delivered to the near-field transducer (NFT), which requires highly accurate optical or temperature sensing. Typically, an electrical element such as an internal laser power monitor (e.g., photodiode) would require extra, dedicated electrical bond pads to provide highly accurate optical or temperature sensing. Since additional bond pads add cost and complexity to the head gimbal assembly, it is desirable to provide for sensing of laser output optical power without the need for such extra electrical bond pads.

For accurate write and read operations to occur, it is desirable to have a relatively small distance or spacing between a read/write head and its associated magnetic recording medium. This distance or spacing is known head-medium spacing, which is interchangeable with the term fly height. By reducing the fly height, a read/write head is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems.

Embodiments of the disclosure are directed to a sensor arrangement internal to the slider for detecting head-medium contact and to facilitate monitoring of output optical power of the laser diode. Embodiments of the disclosure are directed to a sensor that senses for head-medium contact and spacing changes, and also monitors output optical power of the laser diode with an improved signal-to-noise ratio by compensating for thermal background conditions that can otherwise confound temperature measurements made by the sensor. Embodiments are directed to a bolometric sensor that includes at least two electrical components that share electrical bond pads of the slider with a contact sensor, thereby obviating the need for additional bond pads to operate the sensor.

According to various embodiments, a contact sensor is situated at or near an air bearing surface (ABS) of the slider. A bolometer is situated adjacent the core of an optical waveguide formed in the slider so that light produced by the laser diode impinges on or is harvested by the bolometer. A reference sensor, such as a resistor (e.g., metal wire), is situated proximate the bolometric sensor but away from the light path of slider. In other words, the reference sensor is situated close to the bolometer so that both components are exposed to substantially the same thermal background (e.g., same ambient temperature), but outside of the light path so that no light impinges on the reference sensor. In some embodiments, the bolometer and reference sensor are on the same isotherm. Circuitry that includes the bolometer and the reference sensor is configured to effectively subtract off signal content of the bolometer representative of the thermal background experienced by the bolometer and the reference sensor. Having subtracted off the non-optical thermal component of the bolometer signal, the remaining component of the bolometer signal represents the temperature and temperature variations due predominately (e.g., solely) to output optical power and power fluctuations of the laser diode. The contact sensor, bolometer, and reference sensor are arranged in circuitry to advantageously share the same pair of electrical bond pads of the slider.

The bolometer can be situated in or near the optical light path of the slider so that it absorbs or harvests light communicated along the waveguide, while minimally or negligibly impacting light transmission (e.g., minimal or negligible effect on waveguide efficiency and/or the mode profile along the light delivery path). For example, the bolometer can be situated within the internal body of the slider proximate the core of the waveguide, such as within the cladding of the waveguide. The bolometer is preferably situated to sample light that has leaked out of the waveguide core in a low disturbance manner.

In various embodiments, the bolometer comprises a thin metallic element, such as a wire, with a high thermal coefficient of resistance (TCR). The reference sensor can be a thin metallic element, such as a wire, with a high TCR or other type of resistance sensing apparatus. In some embodiments, the bolometer and reference sensor are substantially the same or similar in terms of composition and geometry. For example, the bolometer and reference sensor can have substantially the same geometry (e.g., size and shape) and substantially the same TCR. In some embodiments, the TCRs of the bolometer and reference sensor have the same sign (e.g., both positive or both negative). In other embodiments, the TCRs of the bolometer and reference sensor have different signs (e.g., one positive, the other negative).

When a small bias current is applied across the bolometer, any change in bolometer temperature will create a corresponding change in measured voltage. This change in bolometer temperature results from changes in output optical power of the laser diode and from changes in ambient temperature. At the same time, any changes in ambient temperature are also sensed by the reference sensor. The common ambient temperature component of the bolometer signal is subtracted off, leaving only the temperature and temperature changes due to output optical power of the laser diode. As a result, the bolometer can be used to monitor fluctuations in laser output optical power that cause fluctuations in absorption and temperature in the bolometric sensor with high fidelity. In general, a bolometer-based internal power monitor according to embodiments of the disclosure does not appreciably decrease light path efficiency yet still absorbs enough light to create a sufficiently large signal for detection. Moreover, embodiments of a bolometric sensor arrangement do not require any additional bond pads for temperature compensation, and is also wired in parallel with a contact sensor of the slider.

FIG. 1 shows a side view of a slider 102 configured for heat-assisted magnetic recording in accordance with a representative embodiment. The slider 102 may be used in a magnetic data storage device, e.g., a hard disk drive. The slider 102 may also be referred to herein as a recording head, read/write head, read/write transducer, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 further supports a laser 120 and incorporates an optical waveguide 122. The waveguide 122 delivers light from the laser 120 to components (e.g., a near-field transducer) near the read/write transducers 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113.

To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other locations of the ABS 103.

Figure 2:
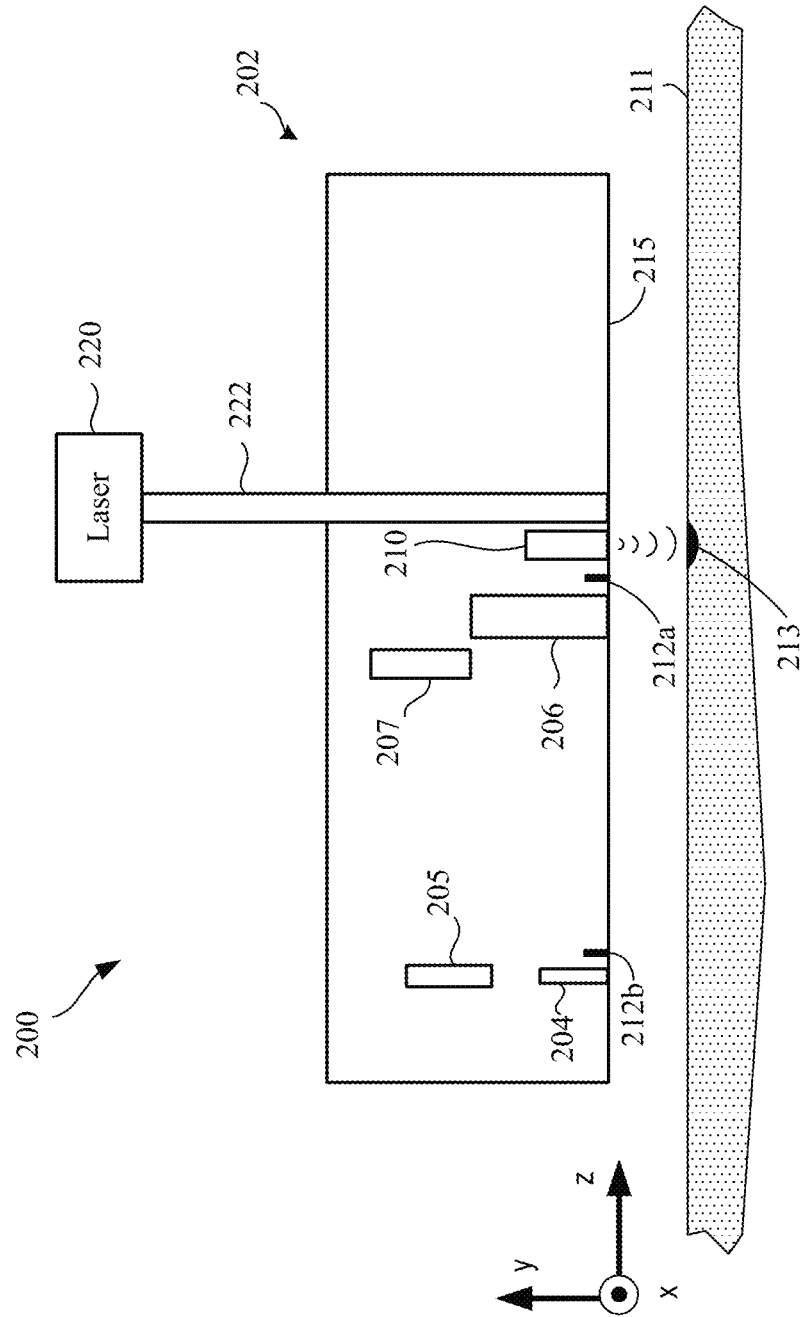
FIG. 2 is a cross-sectional view of a slider in which the various embodiments disclosed herein may be implemented.

FIG. 2 shows a HAMR head arrangement 200 in accordance with various embodiments. The HAMR head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer 210 which is optically coupled to a light source 220 (e.g., laser diode) via an optical waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212a, 212b can be situated at various locations on the slider 202 at or near the ABS 215 for purposes of monitoring temperature, head-medium spacing changes, and head-medium contact. For example, thermal sensor 212a can be situated proximate the writer 206/NFT 210 for sensing spacing changes and head-medium contact occurring at a close point of the writer 206/NFT 210. Thermal sensor 212b can be situated proximate the reader 204 for sensing spacing changes and head-medium contact occurring at a close point of the reader 204.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 gets absorbed by the magnetic medium 211, thereby raising the temperature of the spot 213 on the medium 211 as data is being recorded.

Figure 3:
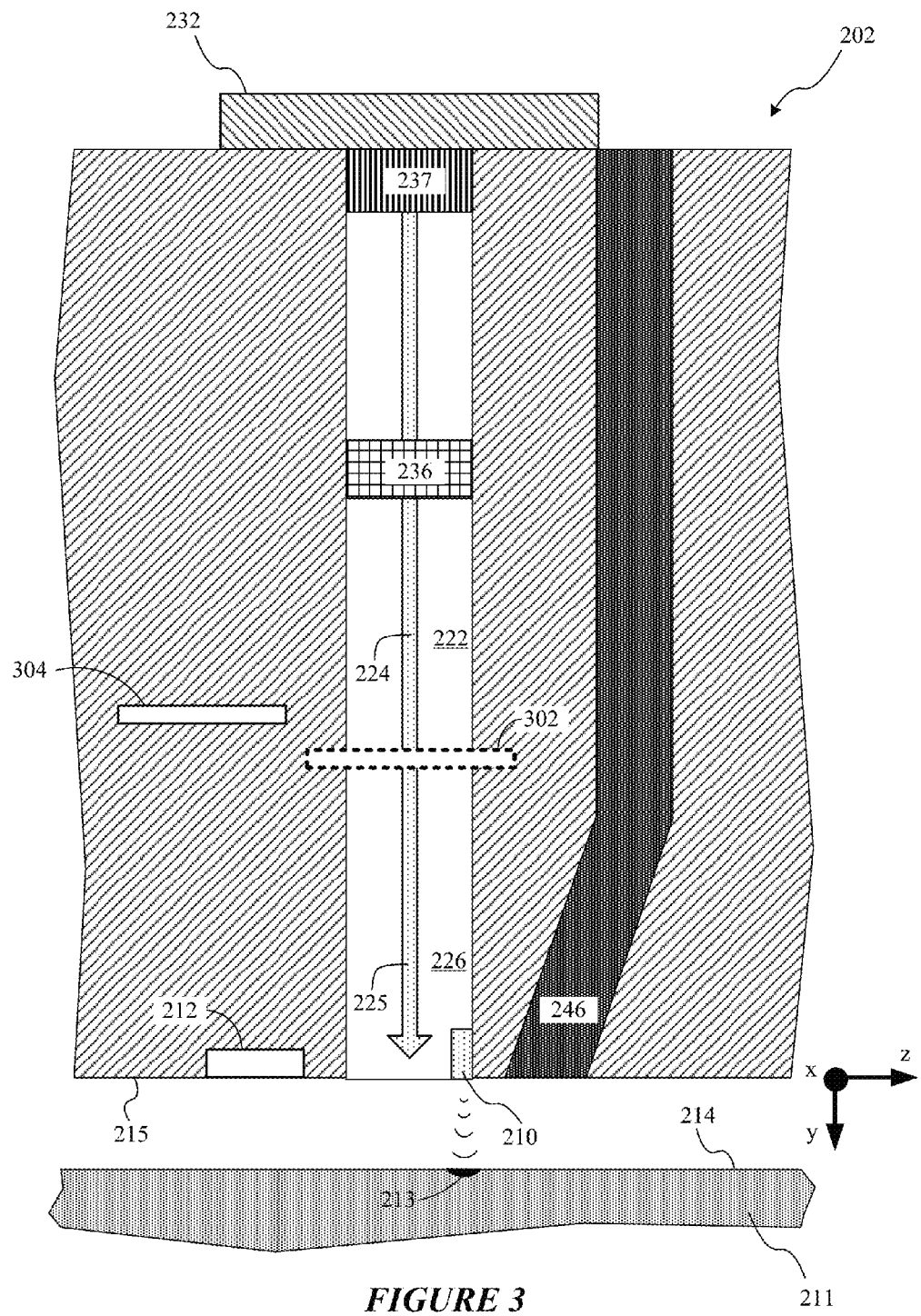
FIG. 3 shows a detailed partial cross-sectional view of an embodiment of a head-assisted magnetic recording (HAMR) slider in accordance with various embodiments.

FIG. 3 shows a detailed partial cross-sectional view of an embodiment of the HAMR slider 202 in accordance with various embodiments. As illustrated, the NFT 210 is positioned proximate the ABS (or media-facing surface) 215 and a magnetic write pole 246. The ABS 215 is shown positioned proximate the surface 214 of the magnetic recording medium 211 during device operation. In the orientation illustrated in FIG. 3, the media-facing surface (or ABS) 215 is arranged parallel to the x-z plane. Electromagnetic energy (e.g., laser light) 224 from the light source (e.g., laser diode) 232 is delivered to a mode converter 236 via the coupler 237 and propagates along the waveguide 222 in the y-direction. Optical wave 225 exits the mode converter 236 and is delivered to the NFT 210 along waveguide 236 in the y-direction. The NFT 210 generates surface plasmon enhanced near-field electromagnetic energy proximate the surface 214 of the medium 211, and exits the NFT 210 in the y-direction. This results in a highly localized hot spot 213 on the media surface 214 when in close proximity to ABS 215 of the slider 202. The write pole 246 generates a magnetic field (e.g., in a y- or perpendicular direction) used for changing the magnetic orientation of the hotspot 213 on the surface 214 during writing.

The slider 202 shown in FIG. 3 incorporates a sensor 302 situated in the vicinity of the light path (e.g., core of the waveguide 222) and proximal of the NFT 210 in accordance with various embodiments. According to some embodiments, the sensor 302 comprises an optical-to-thermal transducer configured to respond to fluctuations in output optical power of the laser 232. The sensor 302 may be implemented in the form of a bolometer or bolometric sensor, for example. In some embodiments, the sensor 302 comprises a thin metallic wire placed across the light path (e.g., core of the waveguide 222) within the internal body of the slider 202 at a location between the coupler 237 and the NFT 210. A small fraction of the output optical power of the laser 232 transmitted via the light path is absorbed by the wire and converted into thermal power, thereby increasing wire temperature. Fluctuations in output optical power of the laser 232 correlate to fluctuations in thermal power and temperature of the sensor 302. These fluctuations in temperature can be detected by circuitry configured to monitor the resistance fluctuations in the wire by using a small bias current and a high thermal coefficient of resistance material. Heating by direct absorption of light greatly decreases the response time and increases bandwidth of the output optical power monitor. The wire can be placed in light path or adjacent to optics to harvest scattered light. The sensor 203 can be situated within cladding of the waveguide 222, for example, and preferably has negligible impact on optical efficiency (e.g., reduces optical efficiency by less than 5%).

As shown in FIG. 3, the bolometric sensor 302 has a longitudinal axis that is oriented transverse to the longitudinal axis of the waveguide 222. More particularly, the bolometric sensor 302 shown in FIG. 3 has a longitudinal axis that is oriented substantially normal to the longitudinal axis of the waveguide 222. In some embodiments, the bolometric sensor 302 is spaced away from a core of the waveguide 222 and positioned above the waveguide 222 in the x-direction. In other embodiments, the bolometric sensor 302 is spaced away from a core of the waveguide 222 and positioned below the waveguide 222 in the x-direction. The bolometric sensor 302 may also be positioned to scavenge otherwise wasted optical energy, although the sensor response may be more limited than when in positions adjacent to the waveguide.

In some embodiments, the longitudinal axis of the bolometric sensor 302 can be oriented diagonally with respect to the longitudinal axis of the waveguide 222. Orienting the bolometric sensor 302 diagonally with respect to the waveguide 222 serves to expose more surface area of the sensor 302 to optical energy transmitted along the waveguide 222 than a perpendicular orientation of the sensor 302. According other embodiments, the bolometric sensor 302 is situated in the vicinity of the light path (e.g., the waveguide 222) and positioned between the coupler 237 and the mode convertor 236.

Figure 4A:
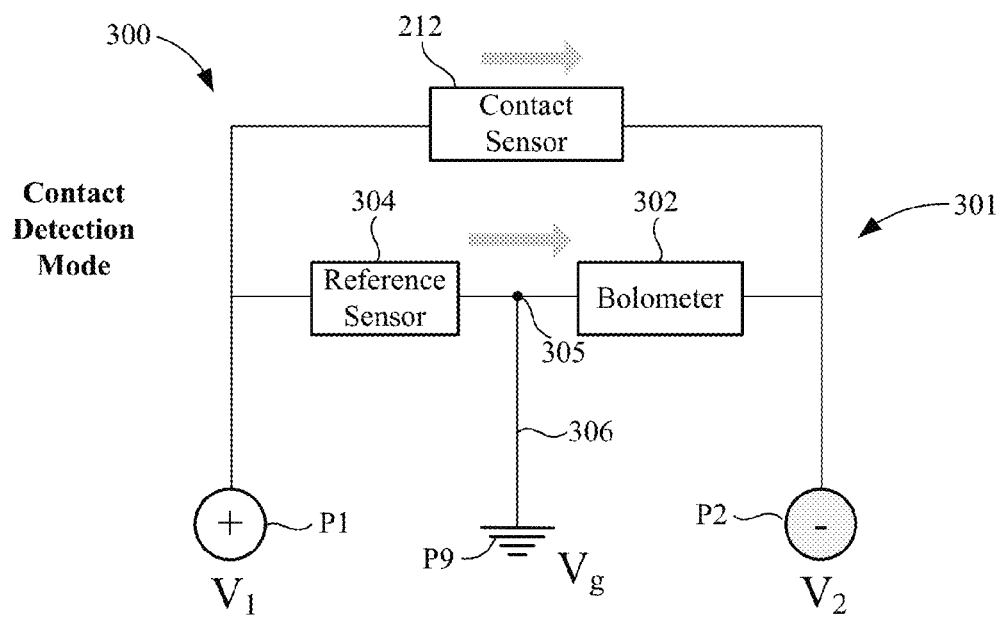
FIGS. 4A and 4B illustrate a sensor circuit of a HAMR slider comprising a contact sensor and a bolometric sensor arrangement operating in different modes in accordance with various embodiments.
Figure 4B:
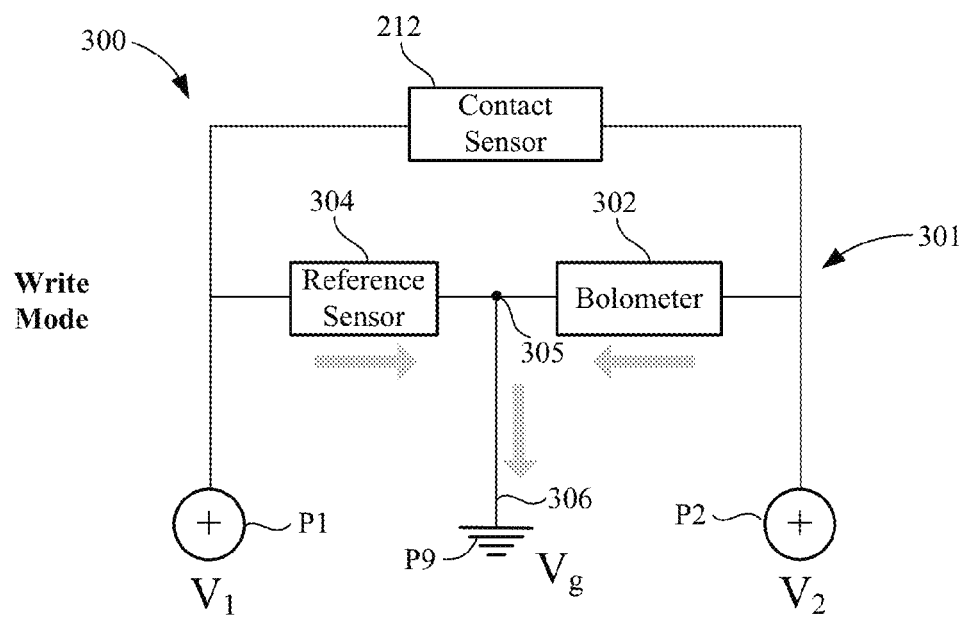

Turning now to FIG. 4A, there is illustrated a sensor circuit 300 of a HAMR slider comprising a contact sensor 212 and a bolometric sensor arrangement 301 in accordance with various embodiments. FIG. 4A shows the sensor circuit 300 operating in a contact detection mode. FIG. 4B shows the sensor circuit 300 of FIG. 4A operating in a write mode. The bolometric sensor arrangement 301 shown in FIG. 4A includes a bolometer 302 and a reference sensor 304. The bolometer 302 and reference sensor 304 can be of a type previously described. The contact sensor 212 can be implemented in a variety of technologies, such as resistance thermal sensors, thermistors, and thermocouples, for example. Certain embodiments disclosed herein are directed to sensors having a temperature coefficient of resistance (referred to herein as TCR sensors), it being understood that other forms and/or means of sensing temperature are contemplated. Some of the TCR sensors described herein are referred to as Dual-ended Thermal Coefficient of Resistance (DETCR) sensors. A DETCR sensor is configured to operate with each of its two electrical contacts (i.e., ends) connected to respective bias sources provided by a pair of electrical bond pads of the slider. Another example of a TCR sensor is a ground-split (GS) temperature coefficient of resistance sensor, in which one end of the GSTCR is coupled to ground and the other is coupled to a bias source via an electrical bond pad of the slider.

A HAMR slider (e.g., slider 102 or 202 shown in FIGS. 1 and 2) supports a multiplicity of electrical components coupled to a set of bond pads, such as nine bond pads P1-P9. For example, the set of bond pads can include eight electrical bond pads (P1-P8) and one ground pad (P9), also referred to as a shared return path. The term "electrical bond pad" refers to a bond pad that is coupled to a detector or a bias source, such as a voltage or current source (AC or DC) that provides power for an electrical component or components. It is noted that the polarity of the electrical bond pads can change during operation, such that a given pad can be at a positive potential at one time and a negative potential at another time. It is understood that the number of electrical bond pads can vary depending on the particular slider design. For simplicity of explanation, only two electrical bond pads (P1 and P2) and one ground pad (P9) are illustrated in FIGS. 4A and 4B, as well as other figures.

As was discussed previously, the bolometric sensor arrangement 301 shown in FIGS. 4A and 4B includes a bolometer 302 and a reference sensor 304. The bolometer 302 and the reference sensor 304 are shown coupled in series with a center-tap coupled to the ground pad P9. In other embodiments, the bolometer 302 and the reference sensor 304 can be coupled in parallel. One end of the sensor circuit 300 is coupled to a first bond pad, P1, and the other end of the sensor circuit 300 is coupled to a second bond pad, P2. A ground connection 306 is coupled to the ground pad, P9, and at a connection 305 (center-tap) between the bolometer 302 and the reference sensor 304. The contact sensor 212 is coupled between the first and second ground pads, P1 and P2. The contact sensor 212 shown in FIGS. 4A and 4B can be considered a dual-ended component which requires two electrical bond pads (e.g., P1 and P2) for proper operation. Because the contact sensor 212 and the bolometric sensor arrangement 301 are coupled to the same bond pads P1 and P2, these bond pads are considered shared bond pads.

The response of the bolometer 302 is based primarily on the light impinging on it from the waveguide and the ambient temperature at the location where the bolometer 302 is situated on the slider. The reference sensor 304 is situated at a location of the slider unexposed to the light but exposed to the ambient temperature. The reference sensor 304 is situated in proximity to the bolometer 302, such that the ambient temperature of the reference sensor 304 is substantially the same as the ambient temperature of the bolometer 302 (e.g., to within 1-2%). For example, the reference sensor 304 can be situated to within about 10 to 15 μm from the bolometer 302. In this regard, the bolometer 302 and the reference sensor 304 are situated on the same isotherm.

The bolometer 302 and the reference sensor 304 are configured or otherwise operated so that a response of these two components to a change in ambient temperature is effectively canceled. For example, the bolometer 302 can be configured to have a positive change in signal output in response to a change in ambient temperature, and the reference sensor 304 can be configured to have a negative change in signal output in response to the change in ambient temperature. It is understood that either of the bolometer 302 and the reference sensor 304 can be configured to have a positive or negative change in signal output in response to a change in ambient temperature, as long as the two components produce output signals that can be combined in a manner that allows cancellation of the effect of temperature variation.

The bolometer 302 and the reference sensor 304 are preferably constructed so that they produce output signals of substantially the same magnitude. Because the bolometer 302 and the reference sensor 304 are subject to the same changes in ambient temperature, the response of the reference sensor 304 to a change in ambient temperature can be effectively subtracted from the response of the bolometer 302 to the same change in ambient temperature. Having canceled the common change to ambient temperature in the bolometer 302 and the reference sensor 304, the resulting output signal produced by the bolometric sensor arrangement 301 is representative predominantly of a change in output optical power of the laser source as sensed by the bolometer 302.

It is noted that a differential amplifier can be coupled to bond pads P1 and P2 for purposes of detecting signals produced by the bolometric sensor arrangement 301. A logic device or processor, for example, can be coupled to the differential amplifier and configured to determine the magnitude of the detected changes in output optical power of the laser source. The logic device or processor can further be configured to adjust current supplied to the laser source in response to the detected changes in output optical power sensed by the bolometric sensor arrangement 301 (e.g., to avoid mode hopping).

For purposes of explanation, the bolometer 302 and the reference sensor 304 can be modeled (and implemented) as resistors each having a temperature coefficient of resistance. For example, the bolometer 302 and the reference sensor 304 can each be a metal wire having a TCR fabricated into the slider. Suitable materials for fabricating the bolometer 302 and the reference sensor 304 include Cr, NiFe, Ni, and other materials that have high TCR. In some implementations, it may be desirable to fabricate the electrical conductors (e.g., traces or leads) that connect the bolometer 302 to the reference sensor 304 and bolometric sensor arrangement 301 to the bond pads P1 and P2 from a material having a relatively low, or near-zero, TCR. It is noted that the electrical conductors that connect the contact sensor 212 to the bond pads P1 and P2 can also be formed from a low or near-zero TCR material. Suitable materials include NiCu and NiCr alloys. Use of low or near-zero TCR materials for the electrical conductors insures that nearly all temperature-related changes in the bolometric sensor arrangement 301 are due to temperature changes experienced by the bolometer 302 and the reference sensor 304, rather than by the electrical conductors coupled thereto. Additional details for biasing the bolometric sensor arrangement 301 can be found in commonly owned U.S. Provisional Patent Application Ser. No. 62/252,009 filed on Nov. 6, 2015, which is incorporated herein by reference.

As was discussed previously, FIG. 4A shows the sensor circuit 300 operating in a contact detection mode. In FIG. 4A, the bond P1 has a positive voltage, $V_1$, and the bond pad P2 has a negative voltage, $V_2$. With this biasing of bond pads P1 and P2, current flows though the contact sensor 212. Current also flows through the reference sensor 304 and the bolometer 302. However, during the contact detection mode, the writer and laser source may be inactive. As such, the reference sensor 304 and the bolometer 302 remain substantially quiescent, allowing for detection of current/voltage changes at the bond pads P1 and P2 due to spacing changes and contact between the contact sensor 212 and a magnetic recording medium. It is noted that no current (or negligible current as some imbalance is possible) flows through the ground connection 306 given the polarities of the bond pads P1 and P2 and the center-tap connection 305 between the reference sensor 304 and the bolometer 302. In some scenarios, it may be desirable that the laser source be active during the contact detection mode, in which case the bolometer 302 would be active. As is discussed below, various known frequency and amplitude filtering techniques can be implemented to distinguish signals produced by the contact sensor 212 from those produced by the bolometer 302. It is noted that, should a mode hop occur during contact detection, any change in laser output optical power due to the mode hop would negligibly impact the protrusion profile at the writer/NFT region of the slider.

FIG. 4B shows the sensor circuit 300 operating in a write mode. In the write mode, each of bond pads P1 and P2 has a positive voltage, $V_1$ and $V_2$ respectively. Preferably, the magnitude of the voltages $V_1$ and $V_2$ are substantially equal. With this biasing of bond pads P1 and P2, no or negligible current flows through the contact sensor 212 during the write mode. The bolometric sensor arrangement 301, however, is active during the write mode. As is indicated in FIG. 4B, current flows from bond pad P1, through the reference sensor 304, and through the ground connection 306 which terminates at ground pad P9. Current also flows from bond pad P1, through the bolometer 302, and through the ground connection 306. With the contact sensor 212 inactive and the bolometric sensor arrangement 301 active, changes in current/voltage at the bolometer 302 indicative of changes in output optical power of the laser source can be monitored at bond pads P1 and P2.

Figure 5A:
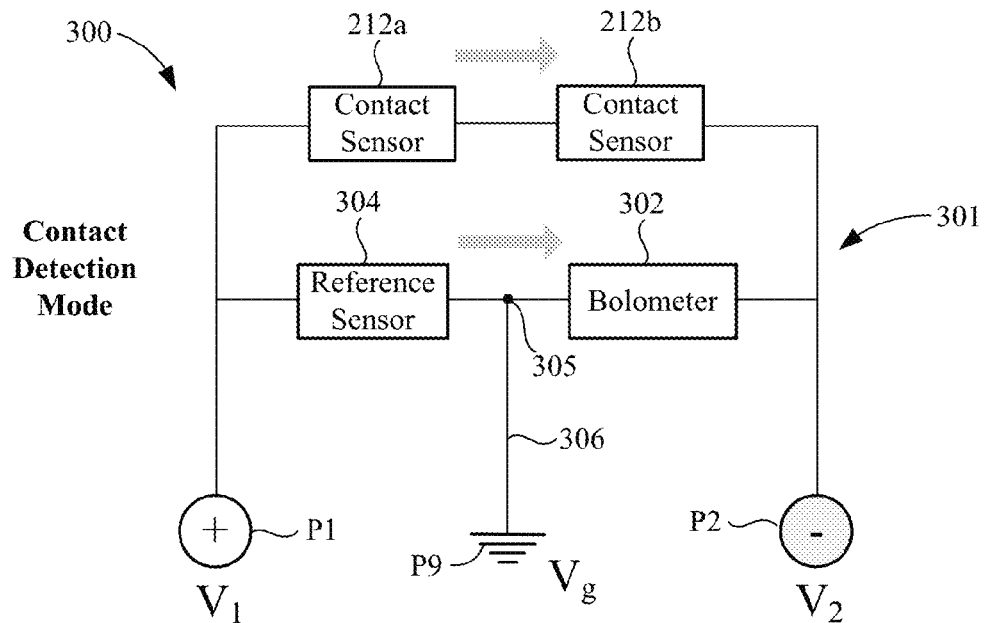
FIGS. 5A and 5B illustrate a sensor circuit of a HAMR slider comprising multiple contact sensors and a bolometric sensor arrangement operating in different modes in accordance with various embodiments.
Figure 5B:
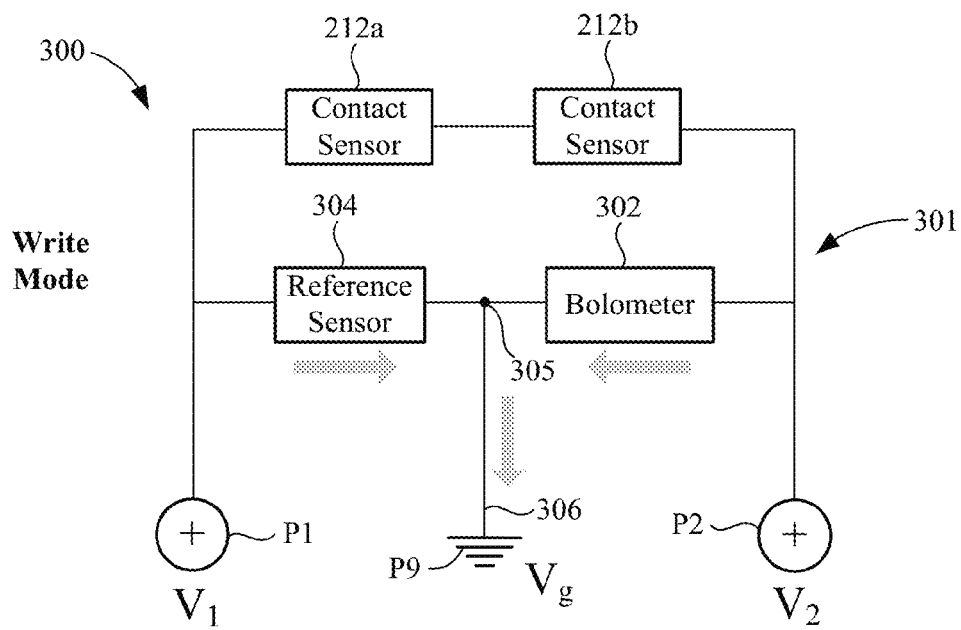

FIG. 5A shows a sensor circuit 300 operating in a contact detection mode. The sensor circuit 300 shown in FIG. 5A includes two contact sensors 212a and 212b. As is depicted in FIG. 2, the contact sensor 212a can be situated proximate the writer 206 of the slider 202 (e.g., at the writer close point). The contact sensor 212b can be situated proximate the reader 204 of the slider 202 (e.g., at the reader close point). It is understood that the contact sensors 212a and 212b may be situated at locations of the slider 202 other than those shown in FIG. 2. In FIGS. 5A and 5B, the contact sensors 212a and 212b are coupled in series. In other embodiments, the contact sensors 212a and 212b can be coupled in a parallel relationship.

As is shown in FIG. 5A, the bond P1 has a positive voltage, $V_1$, and the bond pad P2 has a negative voltage, $V_2$. With this biasing of bond pads P1 and P2, current flows though the contact sensors 212a and 212b. Current also flows through the reference sensor 304 and the bolometer 302. However, during the contact detection mode, the writer and laser source may be inactive. As was previously discussed, the reference sensor 304 and the bolometer 302 remain substantially quiescent, allowing for detection of current/voltage changes at the bond pads P1 and P2 due to spacing changes and contact between the contact sensors 212a and 212b and a magnetic recording medium. As was also discussed previously, it may be desirable that the laser source be active during the contact detection mode, in which case the bolometer 302 would be active. Various known frequency and amplitude filtering techniques can be implemented to distinguish signals produced by the contact sensors 212a and 212b from those produced by the bolometer 302.

Generally, the contact sensors 212a and 212b are situated a different locations of the slider, such that one contact sensor is actively sensing while the other is relatively inactive. For example, the contact sensor 212a situated at a writer close point will be actively sensing when setting clearance for the writer, while the contact sensor 212b situated at a reader close point will be relatively inactive. Conversely, the contact sensor 212a situated at the writer close point will be relatively inactive when setting clearance for the reader, while the contact sensor 212b situated at the reader close point will be actively sensing. This alternating sensing aspect of the two contact sensors 212a and 212b allows for selective sensing of the contact sensors during different operating modes.

FIG. 5B shows the sensor circuit 300 operating in a write mode. With the biasing of bond pads P1 and P2 shown in FIG. 5B (positive and equal voltages $V_1$ and $V_2$), no or negligible current flows through the contact sensors 212a and 212b during the write mode. The bolometric sensor arrangement 301, however, is active during the write mode, with current flowing from bond pad P1, through the reference sensor 304, and through the ground connection 306. Current also flows from bond pad P1, through the bolometer 302, and through the ground connection 306. With the contact sensors 212a and 212b inactive and the bolometric sensor arrangement 301 active, changes in current/voltage at the bolometer 302 indicative of changes in output optical power of the laser source can be monitored at bond pads P1 and P2.

Figure 6A:
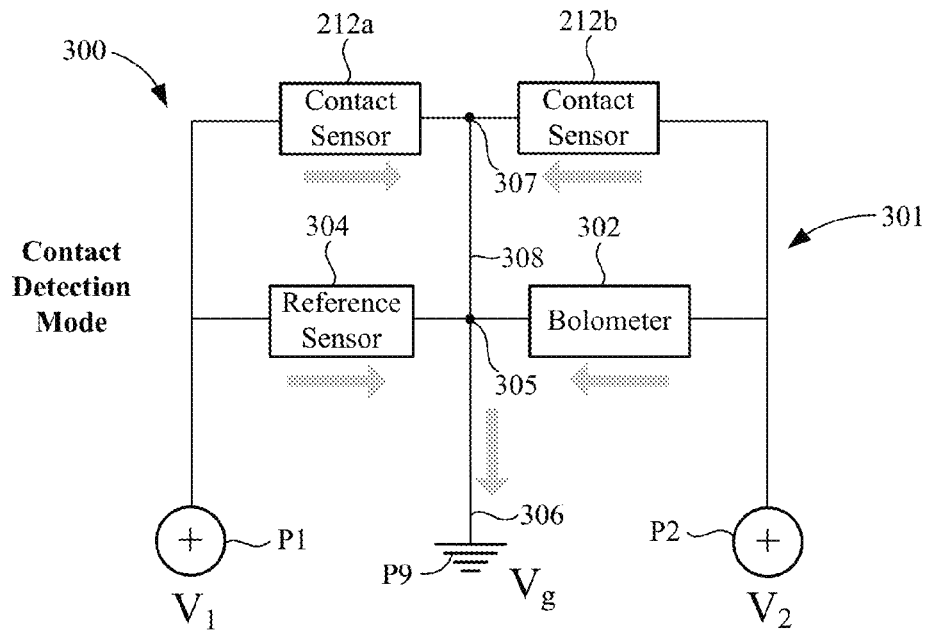
FIGS. 6A and 6B illustrate a sensor circuit of a HAMR slider comprising multiple contact sensors and a bolometric sensor arrangement operating in different modes in accordance with various embodiments.
Figure 6B:
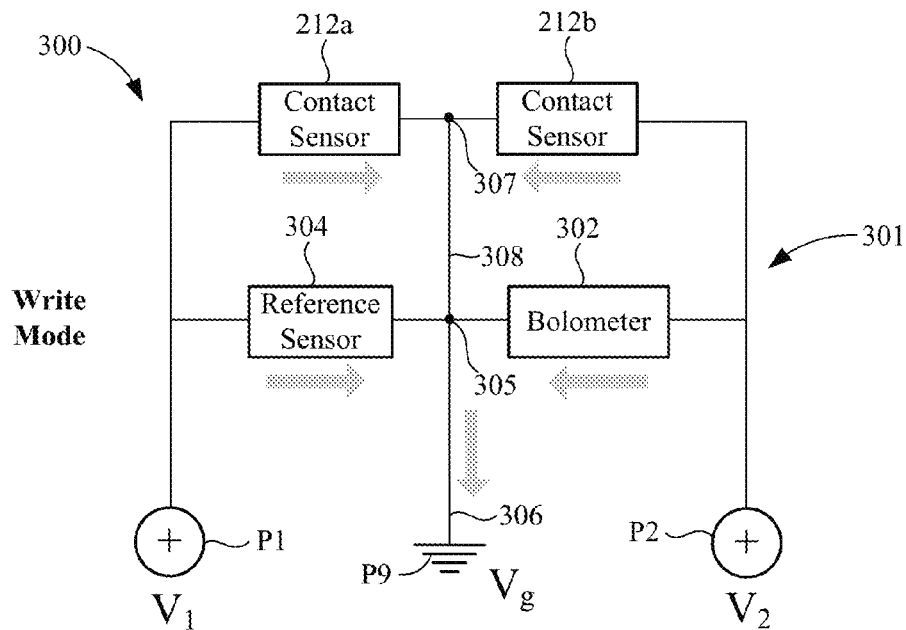

FIGS. 6A and 6B illustrate a sensor circuit 300 which includes a bolometric sensor arrangement 301 in accordance with other embodiments. The sensor circuit 300 shown in FIGS. 6A and 6B includes two contact sensors 212a and 212b configured as ground-split contact sensors. In the ground-split configuration shown in FIGS. 6A and 6B, the contact sensor 212a has a first contact coupled to the bond pad P1 (which provides a positive voltage $V_1$) and a second contact coupled to the ground pad P9 via conductors 308 and 306. The contact sensor 212b has a first contact coupled to the bond pad P2 (which provides a positive voltage $V_2$) and a second contact coupled to the ground pad P9 via conductors 308 and 306. The positive voltages $V_1$ and $V_2$ preferably have the same magnitude. The second contacts of the two contact sensors 212a and 212b are connected at a connection 307.

FIG. 6A shows the sensor circuit 300 operating in a contact detection mode. With the biasing of bond pads P1 and P2 shown in FIG. 6A, both contact sensors 212a and 212b are enabled to actively sense for spacing changes and head-medium contact. More particularly, current flows from the bond pad P1, through the contact sensor 212a, and to the ground pad P9 via conductors 308 and 306. Similarly, current flows from the bond pad P2, through the contact sensor 212b, and to the ground pad P9 via conductors 308 and 306. As was discussed previously, the contact sensors 212a and 212b are typically situated a different locations of the slider, such that one contact sensor is actively sensing while the other is relatively inactive.

In the ground-split contact sensor configuration shown in FIGS. 6A and 6B, the sensor circuit 300 operates similarly whether in the contact detection mode (FIG. 6A) or in a write mode (FIG. 6B). More particularly, current flows through the two contact sensors 212a and 212b, the reference sensor 304, and the bolometer 302 in the directions indicated by arrows in FIGS. 6A and 6B. However, during the contact detection mode shown in FIG. 6A, the writer and laser source may be inactive, such that the reference sensor 304 and the bolometer 302 remain substantially quiescent, allowing for detection of current/voltage changes at the bond pads P1 and P2 due to spacing changes and contact between the contact sensors 212a/212b and a magnetic recording medium. As was discussed previously, it may be desirable that the laser source be active during the contact detection mode, in which case the bolometer 302 would be active. Various known frequency and amplitude filtering techniques can be implemented to distinguish signals produced by the contact sensors 212a and 212b from those produced by the bolometer 302.

During the write mode (FIG. 6B), signals monitored at the bond pads P1 and P2 will include signal content from the bolometer 302 and possibly from one or both of the contact sensors 212a and 212b. According to some embodiments, the bolometer signal content presented at the bond pads P1 and P2 can be distinguished from that of the contact sensors 212a and 212b using various known techniques. For example, a frequency filtering technique can be used to filter the relatively high frequency bolometer signal content from the relatively low frequency contact sensor signal content. By way of further example, an amplitude filtering technique can be used to filter the relatively low amplitude bolometer signal content from the relatively high amplitude contact sensor signal content.

Figure 7:
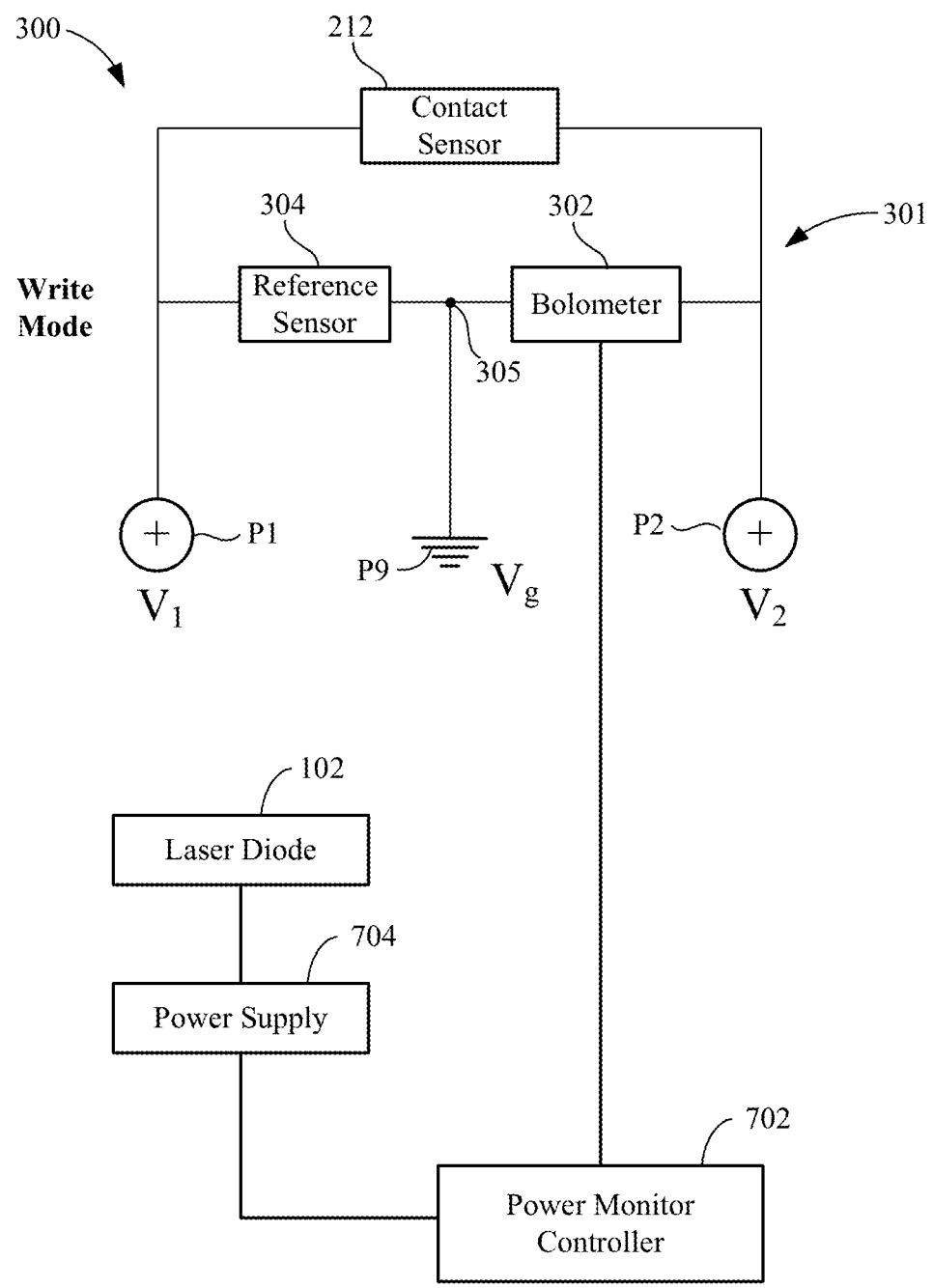
FIG. 7 is a block diagram of an output optical power monitor for a HAMR slider in accordance with various embodiments.

FIG. 7 is a diagram of an output optical power monitor for a HAMR slider in accordance with various embodiments. The apparatus shown in FIG. 7 includes the sensor circuit 300 shown in FIGS. 4A and 4B, with a bolometric sensor arrangement 301 coupled in parallel and sharing bond pads with a contact sensor 212. The sensor circuits 300 shown in FIGS. 5A-6B can alternatively be incorporated in the system diagram of FIG. 7. The bolometer 302 is coupled to an optical power monitor controller 702 configured to detect fluctuations in the sensor signal produced by the bolometer 302, such fluctuations corresponding to fluctuations in output optical power of the laser diode 102. The optical power monitor controller 702 is coupled to a power supply 704 which supplies power to a laser diode 102. The power supply 704 is configured to adjust the power supplied to the laser diode 102 in response to signals received from the optical power monitor controller 702. Monitoring for fluctuations in output optical power of the laser diode 102 using an internal bolometer 302 provides for high precision control of output optical power stability of the laser diode 102 and a reduced risk of mode hopping.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. An apparatus, comprising:
   a slider of a heat-assisted magnetic recording head comprising a ground pad and a plurality of electrical bond pads coupled to bias sources, the slider comprising an air bearing surface and a waveguide configured to receive light from a laser source;
   a plurality of contact sensors situated at different locations at or near the air bearing surface and coupled between a first bond pad and a second bond pad;
   a bolometer coupled to a reference thermal sensor, the bolometer and the reference thermal sensor coupled between the first and second bond pads and in parallel with the contact sensors; and a ground connection coupled to the ground pad and at a connection between the bolometer and the reference thermal sensor.

2. The apparatus of claim 1, wherein the bolometer is situated at a location within the slider that receives at least some of the light communicated along the waveguide, and the reference thermal sensor is situated at a location within the slider unexposed to the light communicated along the waveguide.

3. The apparatus of claim 1, wherein the bolometer and the reference thermal sensor are situated on the same isotherm within the slider.

4. The apparatus of claim 1, wherein signals produced by the bolometer and the reference sensor are of substantially equal magnitude but of opposite polarity in response to an ambient temperature change.

5. The apparatus of claim 1, wherein the bolometer and the reference sensor are coupled in series with a center-tap coupled to the ground pad.

6. The apparatus of claim 1, wherein the bolometer and the reference sensor are substantially equivalent in size and shape.

7. The apparatus of claim 1, wherein each of the bolometer and the reference sensor comprises a metal wire having a temperature coefficient of resistance.

8. The apparatus of claim 1, wherein the plurality of contact sensors are connected in series.

9. The apparatus of claim 1, wherein:
a first contact sensor of the plurality of contact sensors is situated at or near a writer of the slider; and
a second contact sensor of the plurality of contact sensors is situated at or near a reader of the slider.

10. The apparatus of claim 1, wherein the plurality of contact sensors are active in a first mode and inactive in a second mode.

11. The apparatus of claim 1, further comprising a controller coupled to the bolometer and a power supply that powers the laser source, the controller configured to adjust the power supply in response to the bolometer signal.

12. An apparatus, comprising:
a slider of a heat-assisted magnetic recording head comprising a ground pad and a plurality of electrical bond pads coupled to bias sources, the slider comprising an air bearing surface and a waveguide configured to receive light from a laser source;
a first contact sensor situated at a first location at or near the air bearing surface;
a second contact sensor situated at a second location at or near the air bearing surface, the first contact sensor coupled to the second contact sensor, and the first and second contact sensors coupled between a first bond pad and a second bond pad;
a bolometer connected to a reference thermal sensor, the bolometer and reference thermal sensor coupled between the first and second bond pads and in parallel with the first and second contact sensors; and
a ground connection coupled to the ground pad and at a connection between the bolometer and the reference thermal sensor.

13. The apparatus of claim 12, wherein the bolometer is situated at a location within the slider that receives at least some of the light communicated along the waveguide, and the reference thermal sensor is situated at a location within the slider unexposed to the light communicated along the waveguide.

14. The apparatus of claim 12, wherein the bolometer and the reference thermal sensor are situated on the same isotherm within the slider.

15. The apparatus of claim 12, wherein:
the bolometer is configured to produce a signal in response to a change in an ambient temperature and a change in output optical power of the laser source; and
the reference sensor is configured to produce a signal in response to the change in the ambient temperature but not to the change in output optical power.

16. The apparatus of claim 12, wherein signals produced by the bolometer and the reference sensor are of substantially equal magnitude but of opposite polarity in response to ambient temperature change.

17. The apparatus of claim 12, wherein the bolometer and the reference sensor are substantially equivalent in size and shape.

18. The apparatus of claim 12, wherein each of the bolometer and the reference sensor comprises a metal wire having a temperature coefficient of resistance.

19. The apparatus of claim 12, wherein:
the first and second contact sensors are connected in series; and
the bolometer and the reference sensor are connected in series.

20. The apparatus of claim 12, further comprising a controller coupled to the bolometer and a power supply that powers the laser source, the controller configured to adjust the power supply in response to the bolometer signal.

* * * * *